(12) United States Patent
Giamati et al.

(10) Patent No.: US 6,211,494 B1
(45) Date of Patent: Apr. 3, 2001

(54) DRAINMAST WITH INTEGRAL ELECTRONIC TEMPERATURE CONTROL

(75) Inventors: Michael J. Giamati, Akron; Jeffrey J. Siesel, Cuyahoga Falls, both of OH (US)

(73) Assignee: The B. F. Goodrich Company, Akron, OH (US)

( * ) Notice: Subject to any disclaimer, the term of this patent is extended or adjusted under 35 U.S.C. 154(b) by 0 days.

(21) Appl. No.: 09/382,498

(22) Filed: Aug. 25, 1999

(51) Int. Cl.$^7$ .............................. B23K 13/08; B64D 15/00
(52) U.S. Cl. .................. 219/482; 219/201; 244/1 R; 244/134 R; 244/129.1; 244/136
(58) Field of Search ................................. 219/482, 201, 219/200; 244/1 R, 129.1, 134 R, 136, 171, 134 B, 134 D; 392/478

(56) References Cited

U.S. PATENT DOCUMENTS

| | | |
|---|---|---|
| 4,202,061 * | 5/1980 | Waters ........................... 4/317 |
| 5,290,996 | 3/1994 | Giamati et al. . |
| 5,552,576 | 9/1996 | Giamati . |
| 5,655,732 * | 8/1997 | Frank ............................. 244/1 R |
| 6,006,373 * | 12/1999 | Hoang ............................. 4/431 |

* cited by examiner

Primary Examiner—Teresa Walberg
Assistant Examiner—Jeffrey Pwu
(74) Attorney, Agent, or Firm—Renner, Otto, Boisselle & Sklar, LLP

(57) ABSTRACT

A drainmast including an electronic temperature detecting and control circuit contained in a fairing detects the temperature of a drain tube and the electronic temperature detecting and control circuit selectively applies voltage to one or more heating elements in accordance with the detected temperature. The applied voltage may be unequally applied to the heating elements. The electronic temperature detecting and control circuit only requires two leads, one for ground and one for the supplied voltage. The drainmast is reliable, has a long life span and rapidly responds to temperature changes.

22 Claims, 2 Drawing Sheets

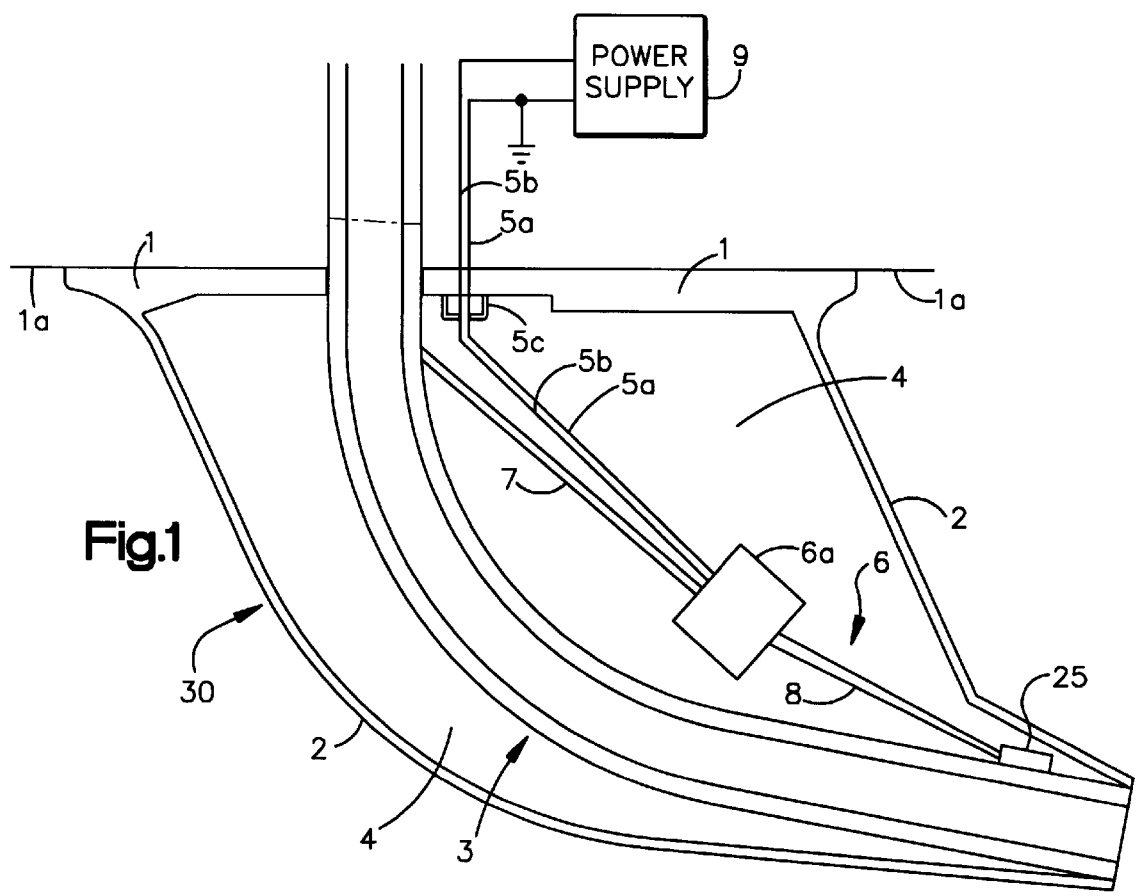
Fig.1
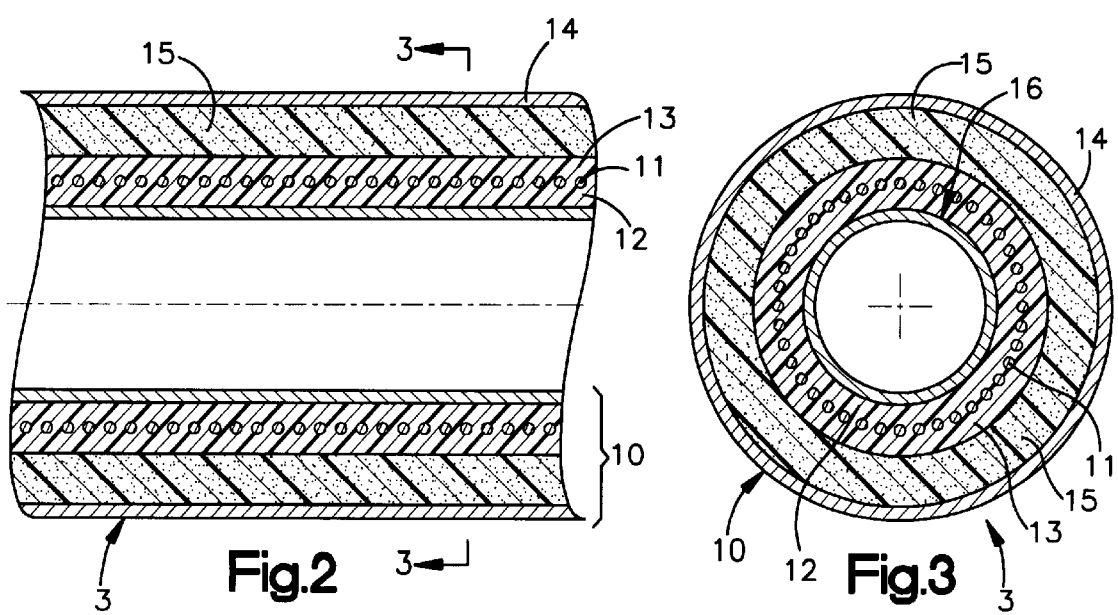
Fig.2
Fig.3

DRAINMAST WITH INTEGRAL ELECTRONIC TEMPERATURE CONTROL

TECHNICAL FIELD OF THE INVENTION

This invention pertains to a drain apparatus, particularly a drainmast for aircraft, and particularly to a drainmast including a heating element or elements controlled by an electronic temperature detecting and control circuit.

BACKGROUND OF THE INVENTION

A drainmast is used to eject waste water from an aircraft waste system during flight without impingement of the ejected fluid further aft on the body of the aircraft, and to drain the waste system when on the ground.

A drainmast generally comprises a drain tube enclosed within an aerodynamically shaped, drag minimizing fairing that when installed protrudes downwardly from the underside of an aircraft such that its outlet extends into the surrounding airflow stream during flight. It may be swept aftwardly of the aircraft with the direction of airflow. The drain tube is coupled to the aircraft waste water storage tank and is heated within the fairing to avoid freezing. There are two prevalent configurations for drainmasts. One is referred to as a bottom discharge mast and the other configuration is referred to as a rear discharge mast.

In a bottom discharge drainmast, the waste water is ejected generally perpendicularly to surrounding airflow. The mast is generally straight and swept. The axis of the drain tube at the exit forms an acute angle with the axis at the entrance. The angle is usually close to the angle of sweep of the mast.

In a rear discharge drainmast, the mast is swept and wing shaped and tapers into an exit tube at the tip that is roughly parallel to surrounding airflow. Water is ejected parallel to the surrounding airflow from the rear of the mast. Since the axis of the drain tube at the exit is nearly perpendicular to the axis at the entrance, the drain tube is either bent in a smooth curve or is fabricated from two or more straight sections that together form the appropriate angle.

The rear discharge mast is believed to be preferable to the bottom discharge mast. A portion of the water ejected from a bottom discharge mast has a tendency to adhere to the tip of the mast and dribble back driven by surrounding airflow. Much of it can freeze to the mast before it is blown away. In contrast, a properly designed rear discharge mast generates a suction action as surrounding airflow passes around the exit tube. Ejected water tends to be sucked out of the tube into surrounding airflow. Very little if any water adheres to the mast.

An exemplary drainmast is described in U.S. Pat. No. 5,552,576.

The drainmast is exposed to a wide range of operating temperatures depending largely on whether the aircraft is in flight or on the ground. Thus, the drain tube is oftentimes heated to ensure that fluid within the drain tube does not freeze and consequently block the passage of fluid through the drain tube. Heating of the drain tube can require high power densities when operating in flight to prevent fluid from freezing in or on the drain tube. When operated on the ground, the power requirements for heating the drain tube are substantially less than when in flight. As a result, if the drain tube remains heated on the ground at the same power levels as in flight, the drain tube can quickly become overheated. Such overheating can exceed safe limits and can cause damage to the fairing and/or the heater. Additionally, varying flight conditions can also result in overheating conditions.

Accordingly, it has been necessary to provide some form of temperature control for the heated drain tube. In the past, various methods of temperature control have been utilized. For example, the drainmast could include a built in mechanical thermostat. Alternatively, the power provided to the heater could be switched between high power during in flight operation and low power for on the ground operation. According to another approach, a temperature sensor located in the drainmast provided temperature information to the aircraft electronics located outside the drainmast which in turn regulate the power provided to the heater.

The above discussed methods for regulating or controlling the temperature have been subject to one or more shortcomings. For example, mechanical thermostats do not always offer the desired precision and possess thermal lag which can make it difficult to accurately control temperatures. In addition, mechanical thermostats are unable to switch higher currents, have shorter lifetimes and are less reliable then other types of temperature control. Temperature control based on switching between high and low power heating requires complicated switching within the aircraft, multiple level power lines, etc. A temperature sensor located in the drainmast required connection to electronics within the aircraft, thereby increasing the number of electrical and mechanical connections necessary between the drainmast and aircraft, thus complicating assembly.

In view of the foregoing short comings associated with previous drainmasts and the techniques for controlling the drain tube temperature, there is a strong need in the art for an improved drainmast and method for controlling the temperature of the drain tube. In particular, there is a strong need for a drainmast which does not require complicated switching or control form the aircraft. There is a strong need for a drainmast which does not require several electrical connections between the drainmast and the aircraft. In addition, there is a strong need for a drainmast which does not rely on mechanical thermostats.

SUMMARY OF THE INVENTION

The present invention provides an improved structure and method of controlling the temperature of a drainmast through the use of an electronic temperature detecting and control circuit. The present invention simplifies the structure of the drainmast by reducing the number of required leads to two while improving the reliability and life span of the drainmast.

According to an embodiment of the present invention, a drainmast including a fairing, a drain tube disposed within the fairing and a heating element which is connected to an electronic temperature detecting and control circuit that senses and controls the power supplied to the heating element is taught.

According to still another aspect of the invention, a method for provided temperature control a drainmast is taught including the steps of detecting the temperature of a drain tube with an electronic temperature detecting and control circuit located in the fairing and using the electronic temperature detecting and control circuit selectively apply a voltage or voltages to one or more heating elements in accordance with the detected temperature.

To accomplish the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention are employed. Other objects, advantages and novel features of the invention will become apparent from the following detailed description of the invention when considered in conjunction with the drawings.

BRIEF DESCRIPTION OF THE DRAWINGS

FIG. 1 is a cross-sectional view of a drainmast according to the present invention.

FIG. 2. cross-sectional view of a drain tube assembly useful with the present invention.

FIG. 3. cross-sectional view of a drain tube assembly useful with the present invention.

DETAILED DESCRIPTION OF THE INVENTION

Figure 4:
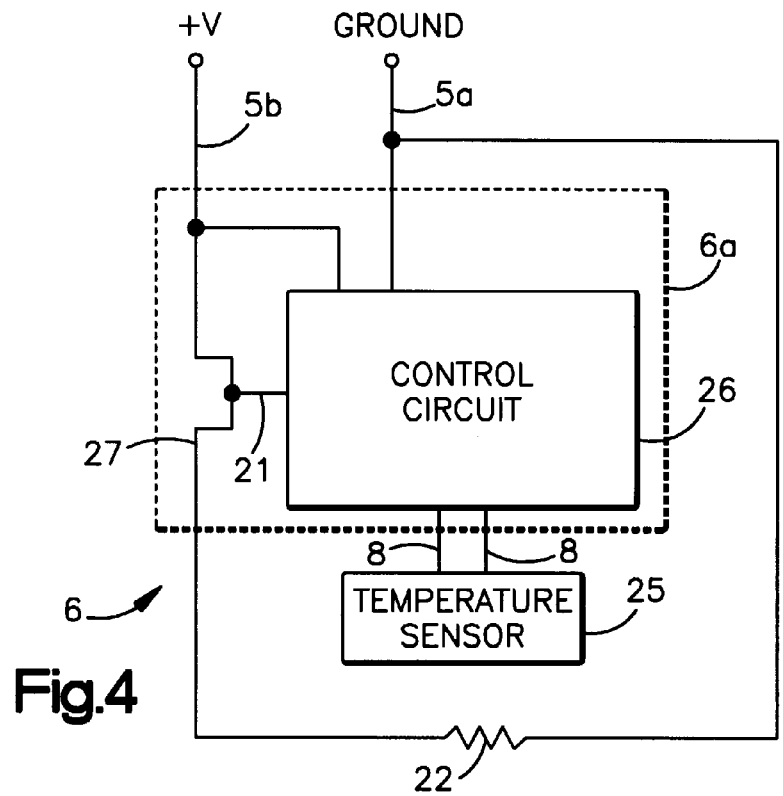
FIG. 4 is a circuit diagram of an electronic temperature detecting and control circuit and heater according to the present invention.

The present invention will now be described in detail with reference to the drawings, wherein like reference numerals are used to refer to like elements throughout.

FIG. 1 shows the general structure of a drainmast 30 in accordance with the present invention. The drainmast 30 includes a mounting base 1 for mounting the drainmast to an underside 1a of an aircraft, a fairing 2, a drain tube assembly 3, a cavity or fairing hollow 4, ground lead 5a, voltage source lead 5b, a connector 5c, an electronic temperature detecting and control circuit 6, power output leads 7 and temperature sensor leads 8. The electronic temperature detecting and control circuit 6 including a controller 6a and a temperature sensor 25 which are connected to each other with temperature sensor leads 8. The ground lead 5a and the input voltage source lead 5b are connected to the aircraft power supply 9 which is located internal to the aircraft and outside the drainmast 30. The leads 5a and 5b are coupled from the drainmast 30 to the aircraft power supply 9 via a connector 5c or the like provided on the surface of the aircraft, for example.

The electronic temperature detecting and control circuit 6 both detects temperature and controls the power supplied to the heating element or elements which heat the drain tube as described more fully below. An example of a drain tube assembly 3 is shown in greater detail in FIGS. 2 and 3. However, the present invention may be applied to virtually any drainmast requiring controlled heating of the drain tube, regardless of the particular configuration of the drain tube. In the exemplary embodiment, drain tube assembly 3 includes an electrical heater 10. The electrical heater 10 includes a resistive heater wire 11 encapsulated in electrical insulating material 12 and 13, a layer of thermal insulation 15, and a radiant heat barrier 14 which in the embodiment shown is metallic foil. The electrical heater 10 is wrapped around and is bonded to the outside of the drain tube 16.

FIGS. 4 shows an equivalent circuit diagram of the present invention.

In the exemplary embodiment, the electronic temperature detecting and control circuit 6 includes the controller 6a and the temperature sensor 25. The controller 6a is made up of a control circuit 26 and a solid-state switching element 27. The temperature sensor 25 preferably is a thermistor, RTD, thermocouple, etc. which is mounted to the drain tube assembly 3 and produces an output indicative of the temperature of the drain tube 16.

The output of the temperature sensor 25 is coupled to the control circuit 26. In the exemplary embodiment, the control circuit 26 is a digital circuit, analog circuit, or combination thereof, which is designed to provide a control output on line 21. The control output on line 21 goes active when the heating of the drain tube 16 is desired, and remains inactive when heating is not required. The control circuit 26 preferably is designed such that heating of the drain tube 16 is performed in order to maintain the temperature within an acceptable range (e.g., between 76° C. and 100° C. at the drain tube foot and 56° C. and 67° C. elsewhere in the drain tube). For example, the control circuit 26 may include a threshold circuit formed by a comparator for controlling the output on line 21 based on the temperature signal from the temperature sensor 25 dropping below a threshold.

The control output line 21 in the exemplary embodiment determines whether the switching element 27 is open or closed. When the switching element 27 is closed (line 21 active), current from power lead 5b is provided through the resistive heater wire 11 (represented by resistor 22) and back to the power supply 9 through power lead 5a as shown. Thus, heating of the drain tube is provided. When the switching element 27 is open (line 21 inactive), no current will flow through the resistor 22 and hence heating of the drain tube is suspended. The switching device 27 may be any device capable of switching high current such as a power MOSFET, SCR, etc. The power leads 5a and 5b are coupled to the heater wire 11 (resistor 22) through the switching element 27, and directly to the control circuit 6 as shown in FIG. 4. The power from the power supply 9 thus is able to provide both operating power to the circuit 6 and power for driving the drain tube heater.

Figure 5:
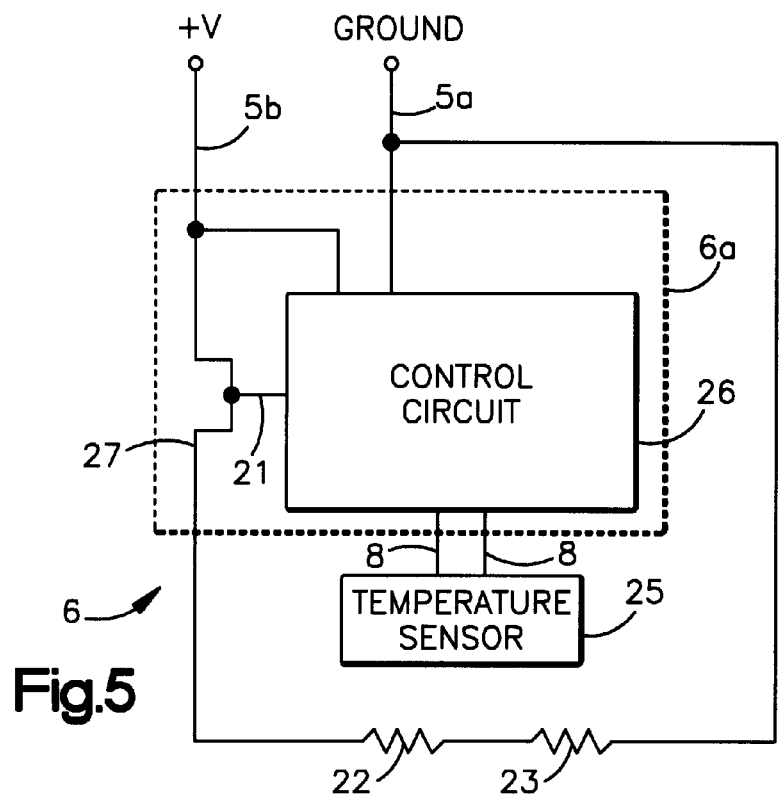
FIG. 5 is a circuit diagram of an electronic temperature detecting and control circuit, heater and foot heater according to another embodiment of the present invention.

FIG. 5 shows an alternative embodiment where a drainmast foot heater (represented by 23) is also included. Alternatively, the heaters may be electrically connected in parallel or separately actuated.

Accordingly, the electronic temperature detecting and control circuit 6 detects the temperature of the drain tube and controls one or more heating elements in accordance with the detected temperature. In an embodiment having multiple heating elements, a single voltage may be applied to all the heating elements (i.e. series circuit) or multiple voltages of different magnitudes may be applied. The control of the heating elements is achieved through the application of voltage to the heating element or elements. The electronic temperature detecting and control circuit 6 may either turn the voltage "on" or "off" according to the detected temperature or alternatively may apply varying magnitudes of voltages according to the detected temperature.

Electronic temperature detecting and control circuit 6 preferably is a solid state device but it may be any kind of electronic temperature detecting and control circuit provided the electronic temperature detecting and control circuit used is able to switch high voltages (e.g. 115 VAC) and low voltages (e.g. 28 VAC or VDC) and is sufficiently compact so as to fit inside the fairing. The circuit 6 may drive the heating element or elements such that power is applied in an "on" or "off" manner with the ratio of "on" to "off" to control the temperature of the drain tube 16 (e.g. duty cycle modulation) or by turning "on" or "off" the heating element or elements when the drain tube reaches a certain temperature (e.g. set points). Alternatively, the circuit 6 may drive the heating element or elements by reducing the magnitude of the voltage applied to control the temperature of the drain tube 16 (e.g. amplitude modulation) or the like. The amount of time voltage is applied or the magnitude of the applied voltage may be determined according to one or more set points or as a continuous or partially continuous function of the sensed temperature.

The invention eliminates the need to have switching provided for both a high power voltage supply for in flight heating and a lower power voltage supply for heating while on the ground. This reduces the number of required leads to two, simplifying the drainmast 30 structure. There is no need for additional electrical and mechanical connections between the drainmast and the aircraft as the present invention does not require that a sensor signal be provided to the aircraft electronics external to the drainmast.

Additionally, electronic temperature detecting and control circuits are able to switch larger currents than mechanical thermostats. Furthermore, since the electronic temperature detecting and control circuit 6 has no moving parts while mechanical thermostats do, the electronic temperature detecting and control circuit is more reliable and will have a longer operating life. The faster response of electronic temperature detecting and control circuits reduces the thermal loading on drainmasts reducing the frequency of drainmast replacement and its associated cost.

In one embodiment, the drain tube 16 is formed from stainless steel, the insulating layers 12 and 13 are Permacell FS903 fiberglass supported silicone elastomer (thermoset) plies 0.023 inch thick, the thermal insulation 14 is Bisco Products Exobloc RF-100 foamed silicone elastomer with an integral outermost layer of aluminum foil that acts as the radiant heat barrier 14, and the heater wire composition is 70% nickel and 30% iron.

Many variations from the particular embodiment illustrated are possible. For example, in certain embodiments the drain tube 1 6 can be formed from any suitable metal including copper or fiber reinforced plastic rather than stainless steel. The layer of thermal insulation 15 can be formed from a variety of commercially available insulating materials or eliminated altogether in certain applications. The same applies to the layer of radiant insulation 14.

In another embodiment, the electrical insulation layers 12 and 13 may be formed from any suitable heat resistant elastomeric material instead of silicone. A heat resistant elastomeric material is defined as an elastomeric material that retains suitable mechanical and electrical properties without degradation during sustained periods of drainmast 30 operation. The electrical insulation layers could also be formed from heat resistant fiber reinforced plastic rather than elastomeric material.

Although the invention has been described with reference to certain embodiments, including the best embodiments, it would be apparent to people skilled in the art of aircraft drainmasts that other variations are possible which are possible thereover. These variations are intended to be included by the present specification and appended claims.

What is claimed is as follows:

1. A drainmast comprising:
   a fairing;
   a drain tube in the fairing;
   at least one heating element proximate the drain tube; and
   an electronic temperature detecting and control circuit in the fairing,
   wherein the electronic temperature detecting and control circuit detects the temperature of the drain tube and controls the at least one heating element in accordance with the detected temperature of the drain tube.

2. The drainmast of claim 1, wherein the electronic temperature detecting and control circuit is a solid state device.

3. The drainmast of claim 1, further comprising first and second power leads.

4. The drainmast of claim 3, wherein the first power lead is a ground lead and the second power lead is a voltage lead.

5. The drainmast of claim 4, wherein the voltage lead carries 115 volts of alternating current.

6. The drainmast of claim 4, wherein the voltage lead carries 28 volts.

7. The drainmast of claim 1, wherein the at least one heating element receives a voltage as a function of the electronic temperature detecting and control circuit.

8. The drainmast of claim 7, wherein the electronic temperature detecting and control circuit controls the magnitude of the voltage received by the at least one heating element.

9. The drainmast of claim 1, wherein the at least one heating element includes a footer heating element.

10. The drainmast of claim 1, wherein the at least one heating element includes a plurality of heating elements.

11. A method of controlling the temperature of a drainmast comprising:
   detecting the temperature of a drain tube within the drainmast with an electronic temperature detecting and control circuit; and
   using the electronic temperature detecting and control circuit to apply selectively a voltage to at least one heating element in accordance with the detected temperature,
   wherein the electronic temperature detecting and control circuit is located within the fairing.

12. A drainmast as set forth in claim 1, wherein the electronic temperature detecting and control circuit comprises a temperature sensor which produces an output indicative of the temperature of the drain tube and a controller which determines, based on the sensor's output, an appropriate power input to the at least one heating element and which controls the power input to the heating element accordingly.

13. A drainmast as set forth in claim 12, wherein the controller comprises a comparator which compares the sensed temperature to a predetermined threshold temperature and which provides power input to the heating element when the sensed temperature drops below the threshold temperature.

14. A drainmast as set forth in claim 13, wherein the electronic temperature detecting and control circuit further comprises a control output line to the heating element and wherein the control output line is active when heating of the drain tube is necessary and is inactive when heating of the drain tube is not required.

15. A drainmast as set forth in claim 14, wherein the controller comprises a switching element which switches the control output line between it active condition and inactive condition.

16. A drainmast as set forth in claim 13, further comprising a voltage lead and a ground lead coupled to the heating element through the switching element and directly to the controller whereby power from an aircraft power supply is able to provide both operating power to the controller and power input to the heating element.

17. A drainmast comprising:

a fairing;

a drain tube in the fairing;

a heating element in the fairing proximate the drain tube; and a controller located within the fairing which determines an appropriate power input to the heating element and controls the power input accordingly.

18. A drainmast as set forth in claim 17, further comprising a temperature sensor within the fairing, wherein the temperature sensor senses the temperature of the drain tube and produces an output indicative thereof and wherein the controller controls the power input based on the output of the temperature sensor.

19. A drainmast as set forth in claim 17, wherein the controller comprises a comparator which compares a sensed temperature to a predetermined threshold temperature and which provides power input to the heating element when the sensed temperature drops below the threshold temperature.

20. A drainmast as set forth in claim 13, further comprising a control output line within the fairing and extending from the controller to the heating element, and wherein the control output line is active when heating of the drain tube is necessary and is inactive when heating of the drain tube is not required.

21. A drainmast as set forth in claim 14, wherein the controller comprises a switching element which switches the control output line between it active condition and inactive condition.

22. A drainmast as set forth in claim 13, further comprising a voltage lead and a ground lead coupled to the heating element through the switching element and directly to the controller whereby power from an aircraft power supply is able to provide both operating power to the controller and power input to the heating element.

* * * * *